Feb. 15, 1966    C. A. STICKLE    3,234,956
PRESSURE CONTROLLER WITH PUSH BUTTON SET MEANS
Filed April 19, 1962    2 Sheets-Sheet 1

INVENTOR.
COLE A. STICKLE
BY
Lockwood, Woodard, Smith & Weikart
Attorneys

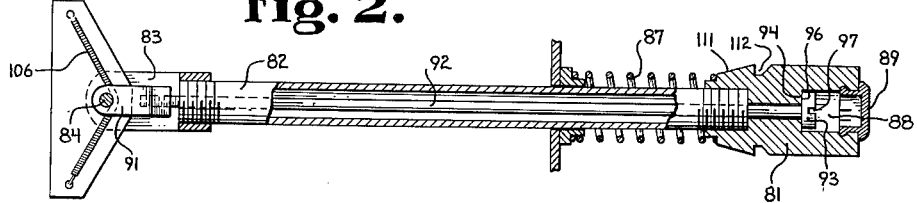
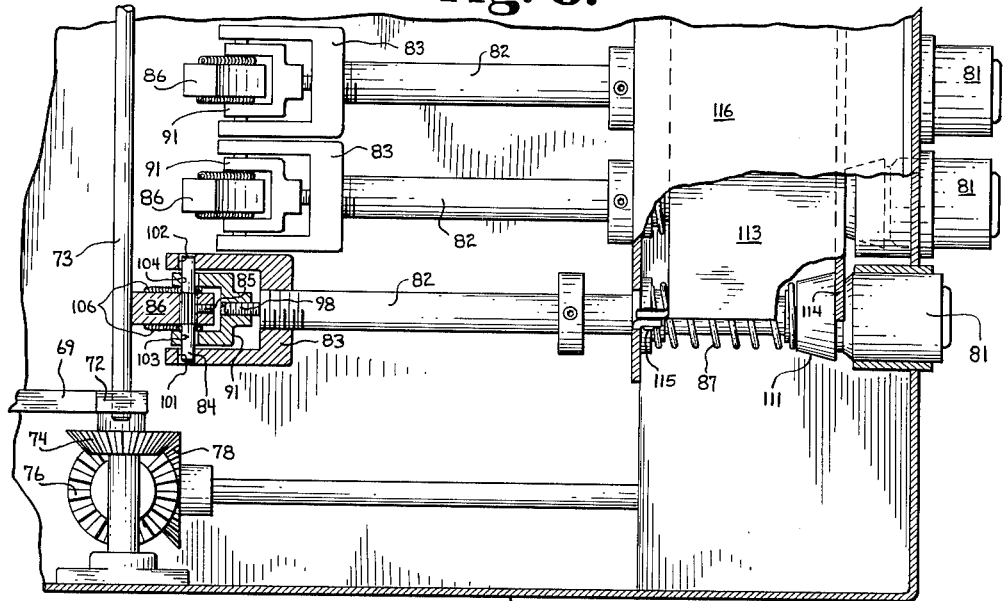
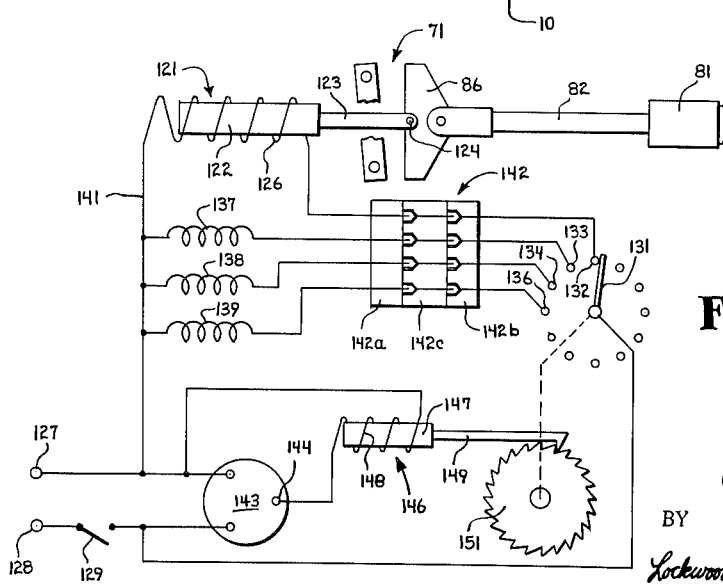
Fig. 2.
Fig. 3.
Fig. 4.
INVENTOR.
COLE A. STICKLE
BY
Lockwood, Woodard, Smith & Weikart
Attorneys

United States Patent Office 3,234,956
Patented Feb. 15, 1966

3,234,956
PRESSURE CONTROLLER WITH PUSH BUTTON SET MEANS
Cole A. Stickle, Indianapolis, Ind., assignor to Stickle Steam Specialties Co., Inc., Indianapolis, Ind., a corporation of Indiana
Filed Apr. 19, 1962, Ser. No. 188,825
3 Claims. (Cl. 137—116.5)

This invention relates generally to fluid supply systems and particularly to a pneumatic supply system wherein a variety of pressures are producible in a pressure line according to the operation of push-buttons.

Heretofore, it has been conventional practice to operate many types of industrial equipment by pneumatic pressure. Examples of devices are flow control valves, pressure regulators, temperature regulators, speed controllers and liquid level controllers. In addition, many types of pneumatic controls are employed on production assembly lines for riveting and for bolt and nut tightening.

Another example of an application of pneumatic pressure is in pressure controlled dampers. In these devices, a damper can be positioned accurately by applying air pressure to a piston which has a linkage coupled to the damper. The degree of rotation of the damper depends on the amount of air pressure applied to the piston. A still further application of pneumatic pressure is in pistons for press rolls on paper machines. In these devices, various pressures are necessary to produce various types and finishes of paper.

In connection with the various applications of pneumatic pressure mentioned above, it has been the practice to provide adjustments for pressure by use of manually operated valves of various types. It is customary for an operator to watch a pressure gauge while turning the valve key or handle or knob to know when the correct air pressure is reached. Where the control is provided by means of a simple pressure reducing valve, if the air pressure on the high side of the valve drops the downstream pressure drops also. There is no means for automatically maintaining downstream pressure to the original setting. Furthermore, where it is necessary to reduce pressure with a pressure reducing valve, it is necessary to bleed air at some point unless there is a continuous air flow at the downstream side. Accordingly there is a considerable waste of compressed air.

The necessity of having an operator work a manual valve has attendant disadvantages. It is difficult for an operator to read a gauge while making adjustments, particularly where there are poor light conditions and less than ideal gauge locations. Moreover, because of these factors, wherever it is necessary to change pressure from time to time, there is opportunity for error each time the operator is required to adjust the valve while viewing the gauge.

It is therefore a general object of the present invention to provide improved means for controlling fluid supply systems.

It is a further object of the present invention to provide control means for fluid supply systems wherein an accurate pressure can be established at the pressure output by the mere pressing of an appropriate button.

It is a still further object of the present invention to provide means for push-button selection of the output pressure of a supply system in combination with a regulator to maintain the output pressure so selected.

It is a still further object of the present invention to provide means having the foregoing characteristics and which can be incorporated in a neat, relatively small sized package.

It is a still further object of the present invention to provide means having the foregoing characteristics and wherein the pressure achieved at the output by operation of an individual button can be readily adjusted or changed.

It is a still further object of the present invention to provide means whereby a predetermined selection of output pressures at various times can be readily obtained.

Described briefly, a typical embodiment of the present invention incorporates a pressure controller having a control valve whose operation is controlled by a sampling bleeder assembly. The bleeder assembly is controlled by a push-button tuner, the operation of which can be controlled automatically by an appropriate timer.

The full nature of the invention will be understood from the accompanying drawings and the following description and the claims.

FIG. 2 is an enlarged cross-sectional view through a push-button assembly according to the present invention.

FIG. 3 represents a plan view of an array of push-buttons as disclosed in FIG. 2 and employed in the typical embodiment of FIG. 1.

FIG. 4 is a schematic diagram of a portion of the present invention incorporating a timer with the push-button tuner assembly.

Figure 1:
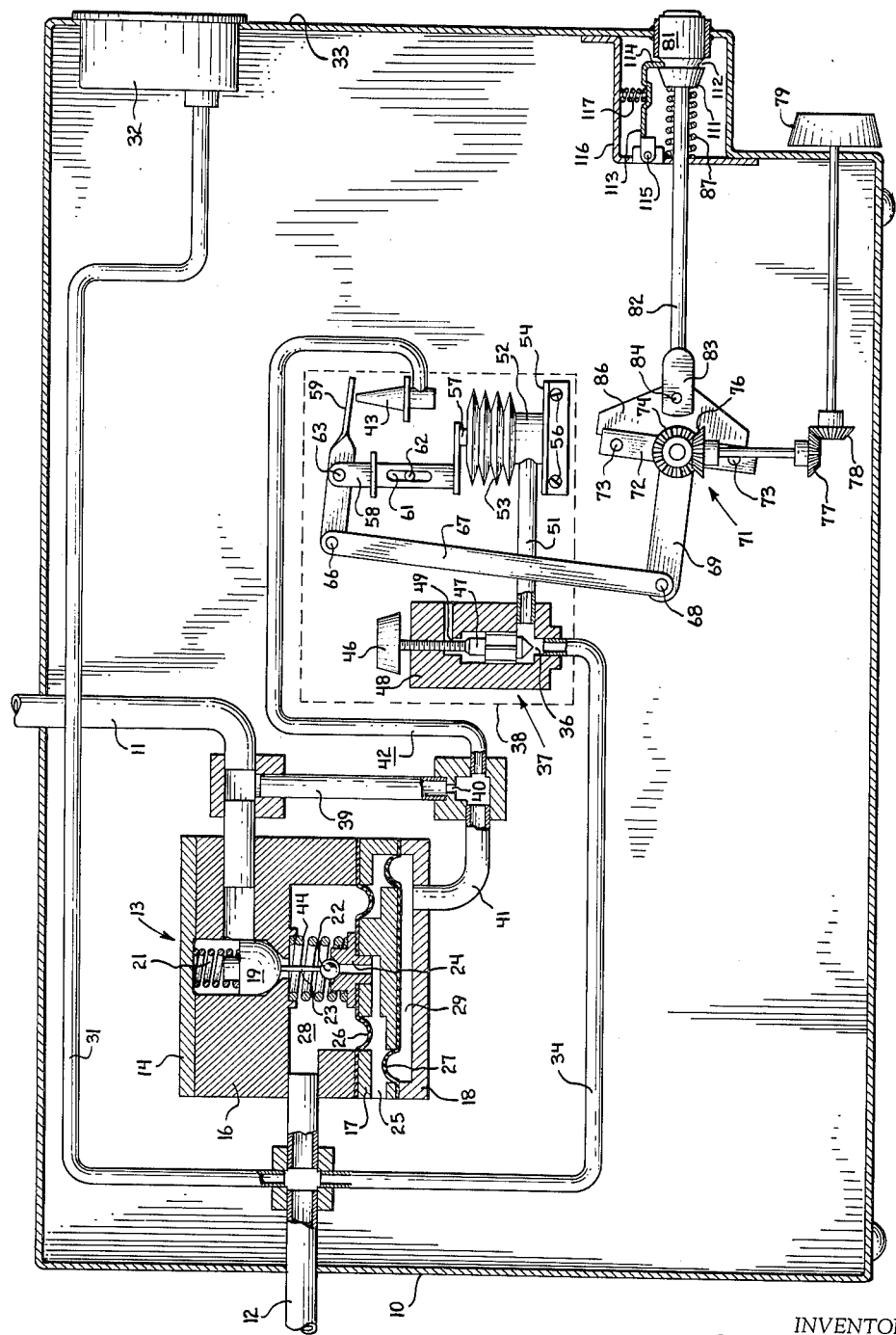
FIG. 1 is a schematic diagram of a supply system according to a typical embodiment of the present invention.

Referring to FIG. 1, the illustrated embodiment is intended to supply pneumatic systems and is incorporated in a housing 10. A source of air at elevated pressure is provided by way of the input line 11 which may be coupled to an air compressor or air storage vessel, for example. An outlet 12 of the controller is provided and the present invention makes possible provision of air at selected pressures at the outlet 12 by merely pressing the appropriate push-button. Inlet line 11 is coupled to a pneumatic relay 13 having a relay body comprising a cover plate 14, an upper intermediate section 16, a lower intermediate portion 17 and a bottom plate 18.

The relay includes the inlet valve 19 which is loaded by spring 21 to seat in the upper intermediate portion 16. An exhaust valve 22 is connected by the stem 23 to the inlet valve 19 and seats against the exhaust valve seat body 24. Upper diaphragm 26 and lower diaphragm 27 provide seals between the body 24 and various portions of the relay body to establish an output chamber 28 and relay chamber 29.

A pressure line 31 is connected from the output line 12 to the pressure gauge 32 located on the front panel 33. A pressure line 34 is connected from the output line 12 to the inlet 36 of the three-way valve 37 of the proportional band adjustment mechanism 38. A line 39 having orifice 40 therein is connected between the input line 11 and the coupling 41 to relay chamber 29. Relay chamber 29 is coupled through the lines 41 and 42 to the nozzle 43 of the proportional band adjustment mechanism 38.

The intermittent pneumatic relay also includes a spring 44 providing a bias between the portion 16 and the body 24.

The three-way valve assembly 37 includes a manual knob 46 secured to the valve 47, the knob being threadedly engaged to the body 48 of the three-way valve. The valve 47 can thereby be manually adjusted between a position where the valve seats on the inlet port 36 or a position where the valve seats on the exhaust port 49. A line 51 is connected from the three-way valve body to the base section 52 of the bellows 53, the base section being mounted by a bracket 54 and screws 56, for example, to the housing 10. The upper end 57 of the bellows is connected by a link 58 to the flapper 59. The link 58 has a slot 61 therein guided by the pin 62 which may be secured to the housing 10. The pin 63 securing the flapper 59 to the link 58 actually serves as a fulcrum for the flapper, but is movable vertically by virtue of the attachment of the link to the bellow 53.

The end of the flapper which is not over the nozzle 43 is connected by pin 66 to one end of the link 67, the other end of link 67 being pinned by pin 68 to the arm 69 secured to the control member 71. Control member 71 includes a pair of side rails 72 with a pair of rods 73 extending between and connecting the side rails. The whole unit is pivotally mounted to the housing 10 and includes a gear 74 secured thereto. The gear 74 is coupled through the gear train 76, 77 and 78 to the manual adjustment knob 79 at the front panel 33 of the housing 10. In this manner, the control member 71 can be rotated by the knob 79.

A plurality of push-buttons 81 is provided in an array extending out of the front panel 33. Each of these buttons is connected to a control member operator. In the illustrated embodiment, each button is connected by a tube 82, yoke 83, pin 84, to a set bar 86. Each button has a return spring 87. Details of the push-button apparatus will be described subsequently with reference to FIGS. 2 and 3.

Referring to FIGS. 2 and 3, it is apparent that the button 81 has a cavity 88 therein. At the end of the cavity is a pressure prong type cap 89 which may be easily removed. Yoke 83 can be seen to be hollow and receives a yoke 91. A lock shaft 92 extends through the tube 82 and has a head 93 thereon with an under face 94 which engages the face 96 of the cavity 88 in the button 81. The head 93 has a slot 97 therein to receive a turning tool such as a screw driver, although a hexagonal socket or other means may be provided in the head 93 as desired.

The lock shaft 92 has threads 98 at the end opposite the head end thereof by which it is threadedly engaged with the yoke 91. Each of the yokes has apertures therein. Yoke 83 has apertures 101 and 102 therein, which are coaxial on an axis transverse to the direction of the axis of the shaft 92. Likewise, yoke 91 has apertures 103 and 104 therein which are also coaxial and transverse to the axis of the shaft 92. By turning the screw 92, the axes of the apertures of yoke 91 and yoke 83 can be made coaxial. In this case, the rod or pin 84 splined or keyed to the set bar 86 and secured by Allen screw 85, can be received by both yokes in which case the set bar is free to move pivotally with respect to the yokes. However, by turning the lock shaft in the appropriate direction, yoke 91 can be drawn toward the button 81 whereby the axis of its apertures is removed from the coaxial relation with the axis of the apertures in the yoke 83 whereupon the rod 84 of the set bar is bound by the two yokes. Thus, the set bar is then secured and cannot be rotated with respect to the yokes. The coil spring 106 mounted on each side of the set bar is to provide some resistance to rotational motion when the lock shaft 92 is loosened so as to prevent a completely loose relationship between yokes and the set bar during adjustment which will be described hereinafter.

Referring to FIGS. 1, 2 and 3, it will be observed that the front portion of the upper surface of each button is provided with a ramp 111 and a notch 112. A locking bar 113 with a depending edge 114 is pivotally mounted at 115 to the bracket 116 secured to the front panel 33 of the housing 10. The locking bar is biased downwardly by the spring 117. When one button is pushed, assuming no other buttons are actuated, the edge 114 falls into the notch 112 of the button pushed to secure it in the engaged position. When the next button is pushed, the ramp 111 thereof releases the previously actuated button by raising the locking bar 113 as the second button is depressed. Other interlock arrangements may be used if desired.

FIG. 4 illustrates a modification of the present invention whereby push-buttons are operated sequentially automatically. In FIG. 4, the push-button and the remainder of the system (not shown) are essentially the same as shown in the preceding figures. However, a solenoid 121 is coupled to one push-button-set bar combination. It has a plunger 122 connected by rod 123 and pin 124 to the set bar 86. Energization of solenoid 121 by current through the winding 126 is effective to set the push-button thus engaging the set bar 86 with the control member 71. Power for the solenoid is provided from the input terminals 127 and 128. Terminal 128 is connected through the automatic mode selector switch 129 to the contact finger 131 of a stepping relay, for example. Each of the contact points 132, 133, 134 and 136 of the stepping relay is connected to a solenoid for operation of a push-button. Windings 137, 138 and 139 represent windings of solenoids for three additional push-button-set bar combinations (not shown). Though windings of four solenoids 121, 137, 138 and 139 are indicated in FIG. 4, it should be understood that more or less can be employed according to the number of pressures needed. The solenoid windings are returned through the common conductor 141 to the input terminal 127. It should be noted that the contact points of the stepper are connected to the solenoid windings through a three piece junction block 142, for purposes which will become apparent.

To provide automatic advancement of the contact finger of the stepping relay, a timer 143 is provided having inputs coupled to the input terminals 127 and 128 for operation of the timer. The timer can be any one of many currently available and can be set to provide an output signal at terminal 144 at predetermined intervals of time. The output signal on terminal 144 energizes the winding 146 of the stepping relay operator solenoid 147 whose winding is returned to input terminal 127. Operation of the solenoid causes the armature 148 thereof to actuate the pawl 149 and the ratchet wheel 151 to move it one step in a manner well known to those skilled in the art. The solenoid 146, the pawl and ratchet wheel, and contact finger may be all parts of a stepping relay such as for example the series S-20 stepper manufactured by the Guardian Electric Manufacturing Company of Chicago.

As the timer advances, each energization and deenergization of the solenoid 146 advances the contact finger 131 one interval to energize a different one of the solenoid windings 121, 137, 138 and 139. Accordingly, a sequence of pressures can be provided according to the timing intervals established by the timer.

If it should be desired to change the sequence of the pressures obtained, this can be achieved in any one of a variety of ways. One manner of effecting such a result is by providing a three piece junction block 142. The plug portion 142a and the socket portion 142b are provided with an intermediate connector portion 142c. Obviously portion 142c has at one side sockets to receive the prongs of plug 142 and at the other side has prongs to enter the sockets or portion 142b. However, the intermediate block can be provided with other than straight-through wiring so that any number of intermediate portions can be provided one-at-a-time between portions 142a and 142b having various connections from the sockets to the prongs thereof. Therefore, by providing an appropriate intermediate block 142c the sequence of button operation can be varied even though the contact finger of the stepper relay moves in only one direction and from one contact point to the next. This is one manner whereby the "programming" of the button actuation can be changed. Obviously other means of establishing a program for the operation of the buttons can be devised. One example would be to provide a punched card or tape with a reading head providing output signals to a particular one of the solenoids operating push-buttons according to which solenoid is indicated by the depressions on the tape.

*Operation of the present invention*

Referring to FIG. 1, air is supplied from the input line 11 through the orifice 40 to the bleeder nozzle 43. Nozzle 43 is large enough that, when not restricted by the flapper 59, it can bleed all of the air coming through the orifice 40. Therefore, in such conditions, there will be zero pressure drop in line 42 between the orifice and nozzle.

However, when the nozzle 43 is restricted in varying degrees by the flapper 59, pressure is built up in the system in direct ratio to the amount of restriction of the nozzle 43 by the flapper 59. This is because the double diaphragm assembly in the pneumatic relay is free floating and pressure balanced. For example, if the flapper 59 tends to close the nozzle 43, or reduce the air flow therefrom, pressure will rise in the chamber 29 below the lower diaphragm 27. This will cause the body 24 to raise and accordingly, the exhaust valve 22 being seated on the body, will be raised and being connected to the inlet valve 19, will open the inlet valve 19. High pressure from the inlet line 11 will then enter the chamber 28 and the increase in pressure in chamber 28 will cause the diaphragm 26 to cause the body 24 to move downwardly again. The body 24 will accordingly move downwardly until the pressure in chamber 28 and therefore at the output line 12 is sufficient to offset the increase in pressure in chamber 29 caused by the reduced flow from the nozzle 43.

If the flapper 59 moves away from the nozzle 43, the pressure in the chamber 29 will drop accordingly. Thus the diaphragm assembly will move down to open the exhaust valve 22, it being unable to move downwardly with the diaphragm assembly by virtue of the fact that the inlet valve 19 is seated in the upper intermediate portion 16 of the relay body. Opening of the exhaust valve 22 allows pressure in chamber 28, the output pressure, to drop by bleeding out through the exhaust port 25 until the diaphragm assembly again returns to its original position to close the exhaust valve 22. Thus it can be seen that the output pressure provided by the relay depends upon the position of the flapper 59 with respect to the nozzle 43. In the illustrated embodiment, the ratio of diameters of diaphragm 27 to diaphragm 26 is three to one. Accordingly, five pounds change on the large diaphragm 27 is effective to cause a fifteen pound change in pressure at the output 12. Other ratios may be obtained by simply providing the desired ratio of sizes of diaphragms.

It will be observed that the proportional band adjustment mechanism, provides for movement vertically of the pivot point 63 of the flapper valve. This movement is effected by changing the pressure in bellows 53. Assuming that the control knob 46 is positioned so that valve 47 provides a substantial opening between the line 34 and line 51 connected to the three-way valve, increased output pressures are fed back by way of the line 34 to the bellows 53 and will cause the flapper to separate from the nozzle 43. The corresponding reduction in pressure in the line 42 will cause a corresponding drop in output pressure by the operation of the relay as previously disclosed. Thus, automatic regulation of pressure is provided.

The degree of regulation which is provided is altered by changing the knob 46. If the knob 46 is adjusted to seat the valve 47 in the inlet port 36, no pressure can be transmitted to the bellows with the result that an extremely small movement of the flapper 59 is necessary to close the nozzle 43. On the other hand, if the valve is seated against the exhaust port 49, all of the diaphragm pressure in line 34 is applied to the bellows 53 which will cause the pivot 63 and therefore the flapper 59 to move away from the nozzle 43. Under these circumstances, the flapper 59 has to move a large distance to close the nozzle 43. Intermediate positions of the valve 47 result in intermediate conditions between the two mentioned.

It is apparent, from the foregoing description, that bleeding output air to the atmosphere occurs only when a pressure drop is called for in the output pressure and not at all times as is the case where a pressure reducing valve is used to establish a desired pressure in a line.

It should be apparent also from the foregoing description and reference to FIG. 1 that providing different attitudes of the set bars 86 with respect to the push-buttons or tubes 82, will provide different attitudes of the control member 71 when the horizontal bars thereof are engaged by the front faces of the different set bars. Rotation of the control member by virtue of the different attitudes of set bars associated with different buttons, provides different flapper settings with respect to the nozzle 43 by virtue of actuation of the push-buttons.

In order to set the set bar of a specific button to provide a specific pressure, the following steps are taken. All of the push-buttons are released. The manual knob 79 is rotated which drives the control member 71 through the aforementioned gear train. The knob is turned until the pressure gauge 32 reads the pressure desired for a specific button. The removable cap on the designated button is removed and the lock shaft is turned until the set bar is comparatively loose rotationally. The push-button is then pressed and when it is pressed, engagement of the set bar thereof with control member horizontal rods will orient the set bar to the position required to correspond to the pressure established by the manual knob 79. Holding the push-button in, the lock shaft is then turned to tighten the set bar in place. The cap may then be replaced on the button and thereafter the button is set to provide the pressure designated, at any time that the button is pushed. Subsequent buttons may be set by a similar process, first establishing the desired pressure by means of the manual knob 79.

The inherent advantages of the present invention are significant. In addition to achieving the objects of the invention as set out herein, other benefits have been derived from the invention. As an example, on an assembly line where a single pressure supply line is available for several pneumatic tools, it has heretofore been necessary to adjust each pneumatic tool individually to obtain the torque output required of the tool. By the use of the present invention, often a single pneumatic tool can be used for a variety of tightening assignments and the simple expedient of pressing a button will alter the pressure to the tool to the extent necessary to obtain the desired torque output thereof.

Another example where the invention is particularly well suited, is in a chemical process where a variety of constituents are mixed at various stages of a compounding operation. Where the valves to admit the various constituents to the solution are operable according to various predetermined pressures, a single supply line can be employed with the present invention and the addition of constituents can be made by simply pressing a button. If desired, an automatic process can be obtained by employing the present invention according to the scheme shown in FIG. 4.

Another advantage is the fact that the present invention can be used for steam and hyraulic controllers. Its versatility is further evidenced by the fact that it can readily be employed where the push-button array must be located at a point remote from the fluid pressure line controlled. One manner of doing this is to connect a potentiometer to the control member. The electrical output of the pot is connected to an electro-mechanical transducer at the remote location. The transducer provides a mechanical output to a flapper or other control device, corresponding to the movement of the control member effected by pushing buttons.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a fluid supply system having a source of fluid at an elevated pressure, and having a pressure controller with an input coupled to said source and an output to provide fluid at a selected pressure, and having a rotatable control member coupled to the controller to provide a level of pressure at the output corresponding to a rotational position of said control member, the coupling of said control member to said controller being direct acting whereby increasing degrees of rotation of said control member in one direction with respect to a reference position cause increasing levels of pressure at said output, said levels increasing between one level when the control member is at the reference position and another level when the control member is at a second position a predetermined number of degrees from the reference position, a plurality of push-button means, and an adjustable bar normally affixed to each of said means and separately engageable with said control member by actuation of said means, the attitudes of various ones of said bars with respect to said member differing, whereby engagement of said member by said bars nonsimultaneously is effective to place said member in various rotational positions between said reference position and said second position to provide a level of pressure between said one level and said another level at the output, the level thereby provided at the output being determined by the individual one of said push-button means which is actuated.

2. In an air supply system having an output, a source of air, and a regulator between said source and said output, said regulator including a control valve coupled between said source and said output and a variable air bleeder assembly coupled to said control valve, said assembly including a pivoted flapper movable through an infinite number of positions between first and second positions to establish an infinite number of levels of pressure at said output between first and second levels, respectively, and a feedback between the output and said bleeder assembly for regulation of output pressure, a push-button tuner, said tuner having a movable member coupled to said variable air bleeder to control said bleeder, said movable member being connected to said flapper, and said movable member being movable between a first attitude placing said flapper in said first position and a second attitude placing said flapper in said second position, and said turner having a plurality of buttons, and means attached to said buttons for engaging said movable member upon actuation of a button to move said member, the engaging means of one button being adapted to move said member an amount different from the amount of movement obtainable by the engaging means of another button, and the engaging means of all of said buttons being able to move said member only an amount placing said movable member in attitudes between said first and second attitudes, whereby said flapper is varied according to the button of said plurality which is actuated to obtain a pressure level at said output between said first and second levels, the level being determined according to the actuated button.

3. A fluid supply system comprising:

a source of fluid under pressure;

a discharge outlet for controlled fluid supply by the systems;

a controller coupled between said source and said outlet to selectively control the pressure producible at said outlet, said controller including a fluid bleeder and a flapper associated with said bleeder to control the bleeding rate of fluid according to the position of the flapper with respect to said bleeder, and said controller including means responsive to changes in said bleeding rate for changing the level of pressure at said outlet to establish a level of pressure at said outlet according to the flapper position;

and a push-button device having output means coupled to the flapper of said controller, said output means being operable, when actuated, to move said flapper, said device having a plurality of push-buttons therein and said device having actuator means on said push-buttons, said actuator means having various positions on the various push-buttons to successively actuate said output means to various extents upon actuation of various push-buttons in succession for positioning said flapper in various positions with respect to said bleeder according to the button actuated, whereby the level of pressure at said outlet is established according to the button actuated.

References Cited by the Examiner

UNITED STATES PATENTS

| 1,301,405 | 4/1919 | MacDougald | 137—505.14 |
| 2,119,251 | 5/1938 | Smyth | 74—479 |
| 2,208,122 | 7/1940 | Dickson | 137—489 |
| 2,344,091 | 3/1944 | Kirk. | |
| 2,399,938 | 5/1946 | Pett | 137—489 X |
| 2,881,792 | 4/1959 | Spence | 137—505.14 X |
| 2,924,124 | 2/1960 | Frosle. | |
| 2,932,213 | 4/1960 | Hale | 74—479 |
| 3,015,003 | 12/1961 | Simmons. | |
| 3,047,010 | 7/1962 | Rothfuss | 137—489 |
| 3,113,582 | 12/1963 | Hudson | 137—489 X |

M. CARY NELSON, *Primary Examiner.*